(12) United States Patent
Marsh et al.

(10) Patent No.: US 9,822,662 B2
(45) Date of Patent: Nov. 21, 2017

(54) COOLING SYSTEM WITH COMPRESSOR BLEED AND AMBIENT AIR FOR GAS TURBINE ENGINE

(71) Applicants: Jan H. Marsh, Orlando, FL (US); John J. Marra, Winter Springs, FL (US)

(72) Inventors: Jan H. Marsh, Orlando, FL (US); John J. Marra, Winter Springs, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 454 days.

(21) Appl. No.: 14/075,140

(22) Filed: Nov. 8, 2013

(65) Prior Publication Data

US 2015/0132101 A1 May 14, 2015

(51) Int. Cl.
| | |
|---|---|
| *F01D 25/12* | (2006.01) |
| *F02C 6/08* | (2006.01) |
| *F02C 7/12* | (2006.01) |
| *F02C 7/18* | (2006.01) |

(52) U.S. Cl.
CPC ............... *F01D 25/12* (2013.01); *F02C 6/08* (2013.01); *F02C 7/12* (2013.01); *F02C 7/185* (2013.01); *F05D 2220/3215* (2013.01); *F05D 2260/601* (2013.01)

(58) Field of Classification Search
CPC .............. F01D 25/08; F01D 25/12; F02C 6/08
See application file for complete search history.

(56) References Cited

U.S. PATENT DOCUMENTS

| | | | | |
|---|---|---|---|---|
| 3,878,677 A | * | 4/1975 | Colvin | F02C 6/08 415/910 |
| 5,579,631 A | * | 12/1996 | Chen | F02C 7/16 60/39.3 |
| 6,487,863 B1 | * | 12/2002 | Chen | F02C 6/08 60/39.12 |
| 6,502,403 B1 | * | 1/2003 | Tazaki | F02C 7/16 60/39.54 |

(Continued)

FOREIGN PATENT DOCUMENTS

| | | |
|---|---|---|
| CN | 102156708 A | 8/2011 |
| EP | 2141336 A2 | 1/2010 |

(Continued)

*Primary Examiner* — Nathaniel Wiehe
*Assistant Examiner* — Brian O Peters

(57) ABSTRACT

A cooling system for a turbine engine for directing cooling fluids from a compressor to a turbine blade cooling fluid supply and from an ambient air source to the turbine blade cooling fluid supply to supply cooling fluids to one or more airfoils of a rotor assembly is disclosed. The cooling system may include a compressor bleed conduit extending from a compressor to the turbine blade cooling fluid supply that provides cooling fluid to at least one turbine blade. The compressor bleed conduit may include an upstream section and a downstream section whereby the upstream section exhausts compressed bleed air through an outlet into the downstream section through which ambient air passes. The outlet of the upstream section may be generally aligned with a flow of ambient air flowing in the downstream section. As such, the compressed air increases the flow of ambient air to the turbine blade cooling fluid supply.

5 Claims, 3 Drawing Sheets

(56) References Cited

U.S. PATENT DOCUMENTS

| | | | | |
|---|---|---|---|---|
| 8,893,509 B2 * | 11/2014 | Tanimura | ................ | F01D 25/30 |
| | | | | 60/785 |
| 9,260,974 B2 * | 2/2016 | Hasting | ................... | F01D 11/24 |
| 2010/0000219 A1 * | 1/2010 | Snook | ....................... | F02C 6/08 |
| | | | | 60/770 |
| 2011/0138819 A1 | 6/2011 | Tanimura | | |
| 2012/0263575 A1 | 10/2012 | Marra | | |
| 2013/0156579 A1 | 6/2013 | Lee et al. | | |
| 2013/0247584 A1 | 9/2013 | Kasibhotla et al. | | |
| 2014/0030067 A1 * | 1/2014 | Kim | ....................... | F01D 25/12 |
| | | | | 415/116 |
| 2014/0126991 A1 * | 5/2014 | Ekanayake | ............. | F02C 7/143 |
| | | | | 415/1 |

FOREIGN PATENT DOCUMENTS

| | | | |
|---|---|---|---|
| EP | 2604807 | A2 | 6/2013 |
| WO | 2012141858 | A1 | 10/2012 |

\* cited by examiner they run at ever increasing loads, a need exists for novel cooling systems for the turbine airfoils that reduce inefficiencies of conventional cooling systems.

COOLING SYSTEM WITH COMPRESSOR BLEED AND AMBIENT AIR FOR GAS TURBINE ENGINE

STATEMENT REGARDING FEDERALLY SPONSORED RESEARCH OR DEVELOPMENT

Development of this invention was supported in part by the United States Department of Energy, Advanced Turbine Development Program, Contract No. DE-FC26-05NT42644. Accordingly, the United States Government may have certain rights in this invention.

FIELD OF THE INVENTION

This invention is directed generally to turbine engines, and more particularly to cooling fluid feed systems with ambient cooling air for turbine airfoils in gas turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. As a result, turbine blades and turbine vanes must be made of materials capable of withstanding such high temperatures. Turbine blades, vanes and other components often contain cooling systems for prolonging the life of these items and reducing the likelihood of failure as a result of excessive temperatures.

Typically, turbine vanes extend radially inward from a vane carrier and terminate within close proximity of a rotor assembly, and turbine blades extend radially outward and terminate within close proximity of the vane carrier. The turbine vanes and blades typically include a plurality of cooling channels positioned in internal aspects therein to cool the vanes and blades from heat acquired from the combustor exhaust gases. As the engines run at ever increasing loads, a need exists for novel cooling systems for the turbine airfoils that reduce inefficiencies of conventional cooling systems.

SUMMARY OF THE INVENTION

A cooling system for a turbine engine for directing cooling fluids from a compressor to a turbine blade cooling fluid supply as compressor bleed air and from an ambient air source to the turbine blade cooling fluid supply to supply cooling fluids to one or more airfoils of a rotor assembly is disclosed. The cooling system may include compressor bleed conduit extending from the compressor to the turbine blade cooling fluid supply that provides compressed air as cooling fluid to at least one turbine blade to cool the turbine blade during start up and cool down procedures. In one embodiment, such configuration may be used together with an ambient air cooling system for the turbine blade. In another embodiment, the compressor bleed conduit may include an upstream section and a downstream section whereby the upstream section exhausts compressed bleed air through an outlet into the downstream section through which ambient air passes. The outlet of the upstream section may be generally aligned with a flow of ambient air flowing in the downstream section. As such, the compressed air energizes the flow of ambient air, increasing the cooling flow reaching the turbine blade and increasing the cooling effectiveness. Such configuration may be useful during start up and cool down procedures when pumping action is less than necessary to pump ambient air.

The cooling system for a turbine engine may include a compressor bleed conduit extending from a compressor to a turbine blade cooling fluid supply that provides cooling fluid to at least one turbine blade. The compressor bleed conduit may have an inlet in fluid communication with compressed air in the compressor and an outlet in the turbine blade cooling fluid supply. The cooling system may include compressor shutoff valves in the compressor bleed conduit to control flow of air into the inlet of the compressor bleed conduit. The cooling system may include one or more ambient air supply inlets for receiving ambient air and may include one or more ambient supply shutoff valves positioned between the ambient air supply inlet and the compressor bleed conduit downstream from the compressor shutoff valve and upstream from the outlet of the compressor bleed conduit for controlling the flow of ambient air through the ambient air supply inlet and into the turbine blade cooling fluid supply.

In at least one embodiment, the turbine blade cooling fluid supply may provide cooling fluid to a stage of turbine blades forming a last stage of turbine blades positioned closest to an exhaust section of the turbine engine. The compressor bleed conduit may include an upstream section and a downstream section, wherein the ambient air supply inlet is positioned at an upstream end of the downstream section and wherein a downstream end of the upstream section terminates within the downstream section downstream from the at least one ambient air supply inlet. The downstream section of the compressor bleed conduit may have a larger cross-sectional area than the upstream section of the compressor bleed conduit. In at least one embodiment, the downstream section of the compressor bleed conduit may have a larger diameter than the upstream section of the compressor bleed conduit.

To facilitate feeding ambient air into the turbine blade cooling fluid supply, the upstream section of the compressor bleed conduit may include an outlet that emits compressor bleed air in a downstream direction that is generally aligned with the flow of ambient air in the downstream section. In addition, the outlet of the upstream section may be aligned with a longitudinal axis of the downstream section. The outlet of the upstream section may be positioned within the downstream section.

A method of delivering ambient cooling fluid to an ambient cooled turbine airfoil may include receiving compressed air into a compressor bleed conduit extending from a compressor to a turbine blade cooling fluid supply that provides cooling fluid to at least one turbine blade, wherein the compressor bleed conduit has an inlet in fluid communication with compressed air in the compressor and an outlet in the turbine blade cooling fluid supply. The method may also include controlling receipt of the compressed air via one or more compressor shutoff valves in the compressor bleed conduit to control flow of air into the inlet of the compressor bleed conduit and receiving ambient air into one or more ambient air supply inlets. The method may include controlling receipt of the ambient air via one or more ambient supply shutoff valves positioned between one or more ambient air supply inlets and the compressor bleed conduit downstream from the compressor shutoff valve and upstream from the outlet of the compressor bleed conduit for controlling the flow of ambient air through the ambient air supply inlet and into the turbine blade cooling fluid supply. The method may also include passing the compressed air and the ambient air to the turbine blade cooling fluid supply.

The method may include passing the compressed air and the ambient air to a stage of turbine blades forming a last stage of turbine blades positioned closest to an exhaust section of the turbine engine. The method may also include receiving compressed air into a compressor bleed conduit formed from an upstream section and a downstream section, wherein the ambient air supply inlet is positioned at an upstream end of the downstream section and wherein a downstream end of the upstream section terminates within the downstream section downstream from the ambient air supply inlet. The method may include receiving compressed air into a compressor bleed conduit that includes an outlet that emits compressor bleed air in a downstream direction that is generally aligned with flow of ambient air in the downstream section.

The method may include controlling receipt of the compressed air via one or more compressor shutoff valves in the compressor bleed conduit by opening the compressor shutoff valve during startup of the gas turbine engine, and may include controlling receipt of the ambient air via one or more ambient supply shutoff valves by closing the ambient supply shutoff valve during startup of the gas turbine engine. The method may also include controlling receipt of the compressed air via one or more compressor shutoff valves in the compressor bleed conduit by closing the compressor shutoff valve during steady state operation after startup of the gas turbine engine, and may include controlling receipt of the ambient air via one or more ambient supply shutoff valves by opening the ambient supply shutoff valve during steady state operation after startup of the gas turbine engine.

An advantage of the cooling system is that the cooling system uses compressor bleed air during startup and shutdown procedures to help feed ambient cooling air to the turbine blade cooling fluid supply when there is not enough pumping power to draw ambient air into the ambient air supply inlet. During engine start, compressor air is often bled into the exhaust to prevent compressor stability problems. The cooling system uses a portion of that compressor bleed air which would otherwise be wasted and uses it in the ambient cooling system where there is not enough pumping power.

Another advantage of the cooling system is that the cooling system includes valves that enable the compressor bleed to be shut down once normal operation has been achieved and sufficient pumping action is occurring within the last stage of the turbine blades to draw ambient air into the ambient air supply inlet and be exhausted into the blades.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
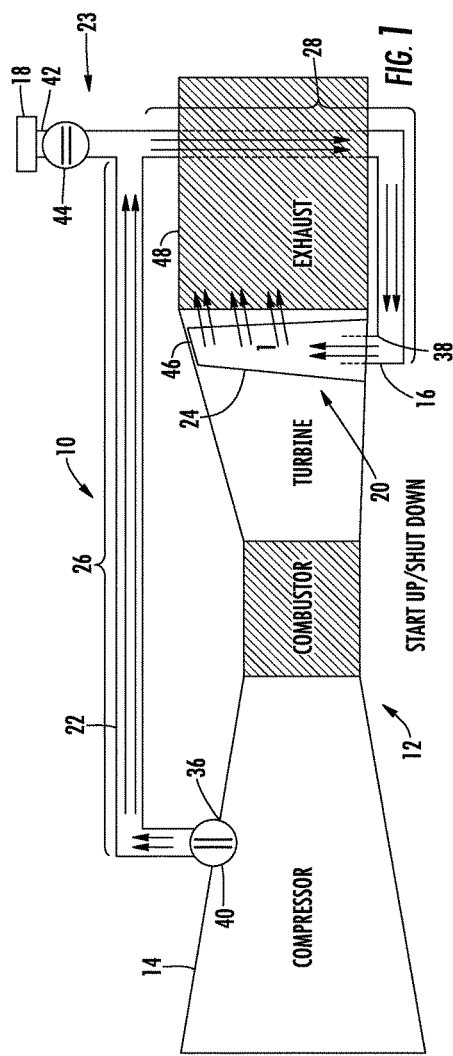
FIG. 1 is a schematic view of a turbine engine a cooling system for directing cooling fluids from a compressor to a turbine blade cooling fluid supply and from an ambient air source to the turbine blade cooling fluid supply to supply cooling fluids to one or more airfoils of a rotor assembly during startup and shutdown of the engine.
Figure 2:
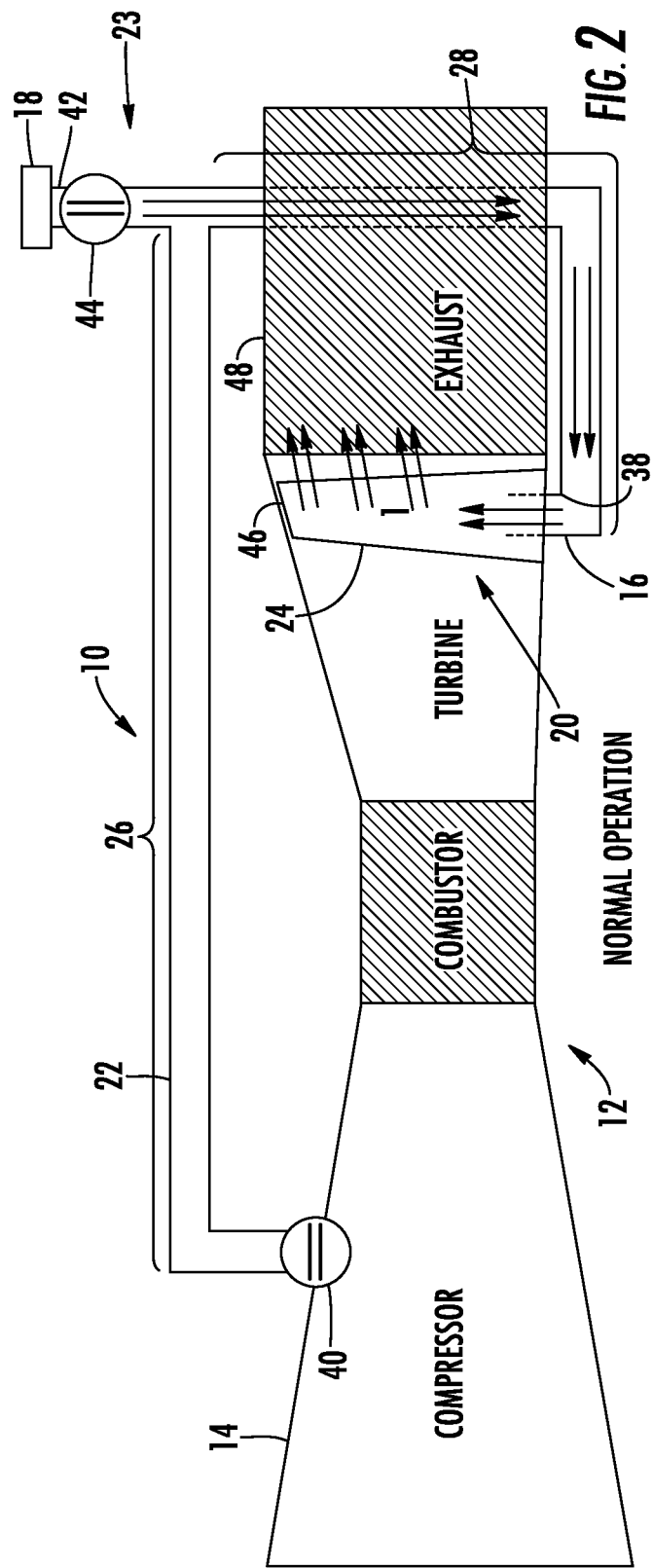
FIG. 2 is a schematic view of the turbine engine a cooling system for directing cooling fluids from a compressor to a turbine blade cooling fluid supply and from an ambient air source to the turbine blade cooling fluid supply to supply cooling fluids to one or more airfoils of a rotor assembly during normal operation of the engine.
Figure 3:
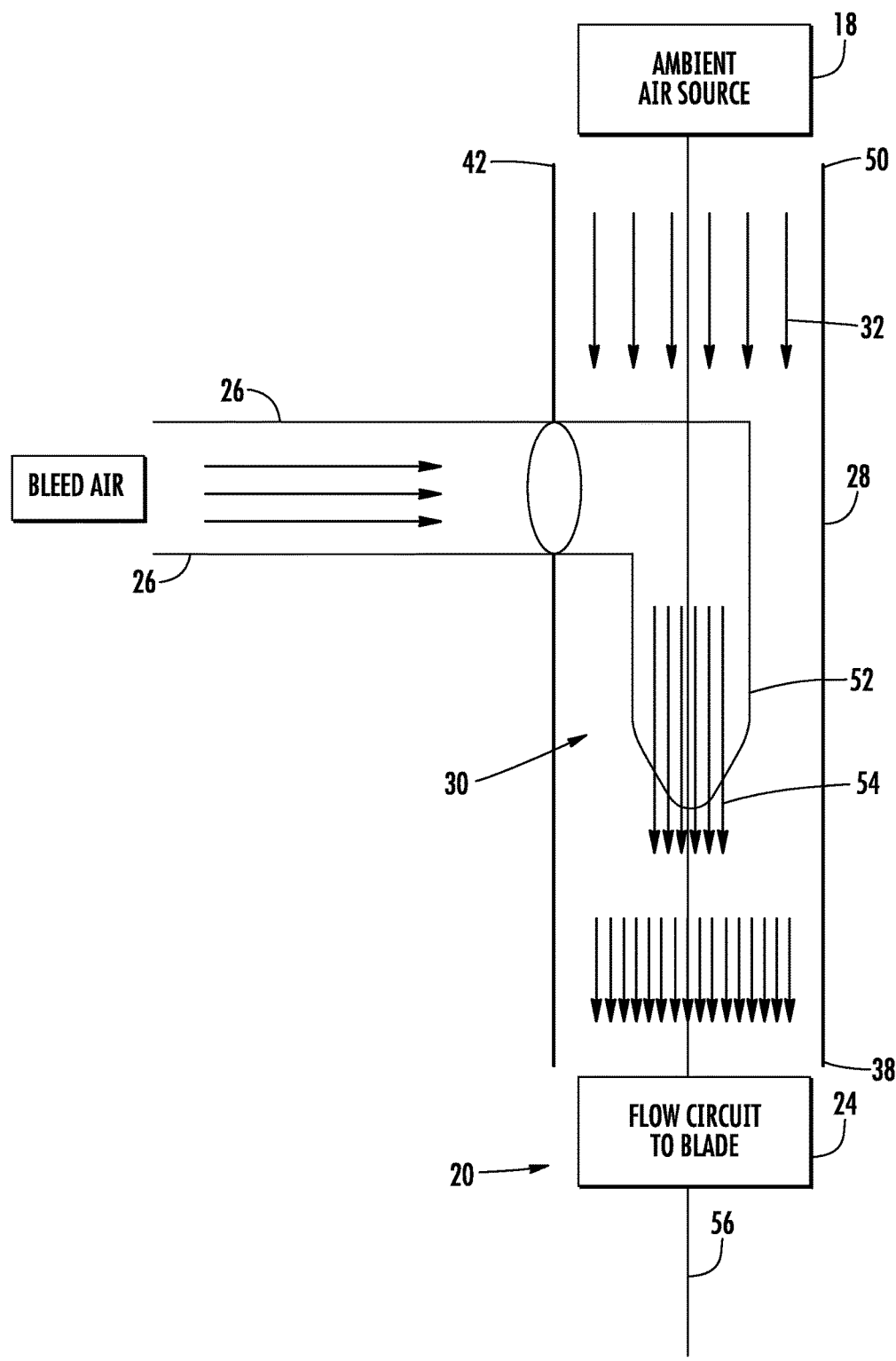
FIG. 3 is cross-sectional view of an alternative embodiment of the cooling system in which the compressor belled conduit is formed from an upstream and a downstream section that receives ambient air from an ambient air cooling system.

As shown in FIGS. 1-3, a cooling system 10 for a turbine engine 12 for directing cooling fluids from a compressor 14 to a turbine blade cooling fluid supply 16 and from an ambient air source 18 to the turbine blade cooling fluid supply 16 to supply cooling fluids formed from compressed air or ambient air, or both, to one or more airfoils 20 of a rotor assembly 22 is disclosed. The cooling system 10 may include compressor bleed conduit 22 extending from the compressor 14 to the turbine blade cooling fluid supply 16 that provides compressed air as cooling fluid to at least one turbine blade 24 to cool the turbine blade during start up and cool down procedures. In one embodiment, such configuration may be used together with an ambient air cooling system 23 for the turbine blade 24. In another embodiment, the compressor bleed conduit 22 may include an upstream section 26 and a downstream section 28 whereby the upstream section 26 exhausts compressed bleed air through an outlet 30 into the downstream section 28 through which ambient air passes to assist in delivering the ambient air to the turbine blade cooling fluid supply 16. The outlet 30 of the upstream section 26 may be generally aligned with a flow of ambient air 32 flowing in the downstream section. As such, the compressed air energizes the flow of ambient air 23, increasing the cooling flow reaching the turbine blade 24 and increasing the cooling effectiveness. Such configuration may be useful during start up and cool down procedures when pumping action from the turbine blades 24 is less than necessary to pump ambient air.

The cooling system 10 may include a compressor bleed conduit 22 extending from the compressor 14 of a gas turbine engine 12 to a turbine blade cooling fluid supply 16 that provides cooling fluid to at least one turbine blade 24. The compressor bleed conduit 22 may be formed from a plenum, pipe or other containment structure having any appropriate cross-sectional shape. In at least one embodiment, the turbine blade cooling fluid supply 16 may provide cooling fluid to a stage of turbine blades 46 forming a last stage of turbine blades positioned closest to an exhaust section 48 of the turbine engine 12. The compressor bleed conduit 22 may have an inlet 36 in fluid communication with compressed air in the compressor 14 and an outlet 38 in the turbine blade cooling fluid supply 16.

The cooling system 10 may include one or more compressor shutoff valves 40 in the compressor bleed conduit 22 to control flow of air into the inlet 36 of the compressor bleed conduit 22. The compressor shutoff valves 40 may be formed from any appropriate configuration, such as, but not limited to, a gate valve, a globe valve, a pinch valve, a diaphragm valve, a needle valve, a plug valve, a ball valve and a butterfly valve. The compressor shutoff valves 40 may be manual or electronically controlled, such as via a solenoid, automatic or configured in another appropriate manner.

The cooling system 10 may include one or more ambient air supply inlets 42 for receiving ambient air. The ambient air supply inlet 42 may have any appropriate configuration. One or more ambient supply shutoff valves 44 may be positioned between the at least one ambient air supply inlet 42 and the compressor bleed conduit 22 downstream from the compressor shutoff valve 40 and upstream from the outlet 38 of the compressor bleed conduit 22 for controlling the flow of ambient air through the ambient air supply inlet 42 and into the turbine blade cooling fluid supply 16. In at least one embodiment, the ambient supply shutoff valve 44 may be offset from the compressor bleed conduit 22 such that the ambient air supply inlet 42 is in communication with an ambient air source 18 and the flow through the ambient air supply inlet 42 may be controlled independently of the flow through the compressor bleed conduit 22. The ambient supply shutoff valves 44 may be formed from any appropriate configuration, such as, but not limited to, a gate valve, a globe valve, a pinch valve, a diaphragm valve, a needle valve, a plug valve, a ball valve and a butteryfly valve. The ambient supply shutoff valves 44 may be manual or electronically controlled, such as solenoid controlled, automatic or configured in another appropriate manner.

In another embodiment, as shown in FIG. 3, the compressor bleed conduit 22 may include an upstream section 26 and a downstream section 28. The ambient air supply inlet 42 may be positioned at an upstream end 50 of the downstream section 28. A downstream end 52 of the upstream section 26 may terminate within the downstream section 28 downstream from the ambient air supply inlet 42. The downstream section 28 of the compressor bleed conduit 22 may have a larger cross-sectional area than the upstream section 26 of the compressor bleed conduit 22. More specifically, the downstream section 28 of the compressor bleed conduit 22 may have a larger diameter than the upstream section 26 of the compressor bleed conduit 22.

The upstream section 26 of the compressor bleed conduit 22 may include an outlet 30 that emits compressor bleed air in a downstream direction 54 that is generally aligned with the flow of ambient air in the downstream section 28. In at least one embodiment, the outlet 30 of the upstream section may be aligned with a longitudinal axis 56 of the downstream section 28. The outlet 30 of the upstream section 26 may be positioned within the downstream section 28.

A method of delivering ambient cooling fluid to an ambient cooled turbine airfoil 20 is also disclosed. The method may include receiving compressed air into a compressor bleed conduit 22 extending from a compressor 14 to a turbine blade cooling fluid supply 16 that provides cooling fluid to at least one turbine blade 24. The compressor bleed conduit 22 may have an inlet 36 in fluid communication with compressed air in the compressor 14 and an outlet 38 in the turbine blade cooling fluid supply 16. The method may also include controlling receipt of the compressed air via one or more compressor shutoff valves 40 in the compressor bleed conduit 22 to control flow of air into the inlet 36 of the compressor bleed conduit 22. The method may also include receiving ambient air into one or more ambient air supply inlets 42. The method may include controlling receipt of the ambient air via one or more ambient supply shutoff valves 42 positioned between the ambient air supply inlet 42 and the compressor bleed conduit 22 downstream from the compressor shutoff valve 40 and upstream from the outlet 38 of the compressor bleed conduit 22 for controlling the flow of ambient air through the ambient air supply inlet 42 and into the turbine blade cooling fluid supply 16. The method may also include passing the compressed air and the ambient air to the turbine blade cooling fluid supply 16.

The method may include passing the compressed air and the ambient air to a stage 46 of turbine blades forming a last stage of turbine blades positioned closest to an exhaust section 48 of the turbine engine 12. In another embodiment, the method may include receiving compressed air into a compressor bleed conduit 22 formed from an upstream section 26 and a downstream section 28, wherein the ambient air supply inlet 42 is positioned at an upstream end 50 of the downstream section 28 and wherein a downstream end 52 of the upstream section 26 terminates within the downstream section 28 downstream from the ambient air supply inlet 42. The method may also include receiving compressed air into a compressor bleed conduit 22 that includes an outlet 30 that emits compressor bleed air in a downstream direction that is generally aligned with flow of ambient air 32 in the downstream section 28.

During startup of the gas turbine engine 12 or during shutdown of the gas turbine engine, or both, the compressor shutoff valve 40 may be opened, and the ambient supply shutoff valve 44 may be closed to prevent compressed air from being exhausted through the ambient air supply inlet 42. During steady state operation after startup of the gas turbine engine 12, the compressor shutoff valve 40 may be closed, and the ambient supply shutoff valve 44 may be opened to permit ambient air to flow into the downstream section 28 and into the turbine blade cooling fluid supply 16, while eliminating the flow of compressed air into the turbine blade cooling fluid supply 16.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of delivering ambient cooling fluid to an ambient cooled turbine airfoil, comprising: receiving compressed air into a compressor bleed conduit formed by an upstream section in fluid communication with compressed air in a compressor and a downstream section located within an exhaust section of a turbine engine, the downstream section being in fluid communication with a turbine blade cooling fluid supply that supplies cooling fluid to at least one turbine blade, wherein the exhaust section is located downstream of the turbine blade, wherein the downstream section of the compressor bleed conduit has a larger cross-sectional area than the upstream section of the compressor bleed conduit; controlling receipt of the compressed air via at least one compressor shutoff valve in the upstream section of the compressor bleed conduit to control flow of air into the inlet of the compressor bleed conduit, wherein the compressor shutoff valve is operable to be in an open and in a closed position, wherein in the open position, compressed air from the compressor is led, via said upstream section and via said downstream section in said exhaust section of the turbine engine, to the turbine blade cooling fluid supply; receiving ambient air into at least one ambient air supply inlet; controlling receipt of the ambient air via at least one ambient supply shutoff valve positioned between the at least one ambient air supply inlet and the downstream section of the compressor bleed conduit, wherein the ambient air supply shut off valve is operable to be in an open and in a closed position, wherein in the open position during a steady state operation, ambient air from the ambient air supply is in fluid communication with the downstream section of the compressor bleed conduit in the exhaust section of the turbine engine, and is led therethough to supply said ambient air to the turbine blade cooling fluid supply; passing the compressed air and the ambient air to the turbine blade cooling fluid supply, wherein the at least one ambient air supply inlet is positioned at an upstream end of the downstream section and wherein a downstream end of the upstream section is positioned within and surrounded by the downstream section, and is located downstream from the at least one ambient air supply inlet; during start-up and/or shutdown of the turbine engine the compressor shutoff valve is open while the ambient air shutoff valve is closed; and during the steady state operation the compressor shutoff valve is closed while the ambient air shutoff valve is open.

2. The method of delivering ambient cooling fluid to an ambient cooled turbine airfoil of claim 1, wherein passing the compressed air and the ambient air to the turbine blade cooling fluid supply comprises passing the compressed air and the ambient air to a stage of turbine blades forming a last stage of turbine blades positioned closest to the exhaust section of the turbine engine.

3. The method of delivering ambient cooling fluid to an ambient cooled turbine airfoil of claim 1, wherein receiving compressed air into a compressor bleed conduit comprises receiving compressed air into a compressor bleed conduit that includes an outlet that emits compressor bleed air in a downstream direction that is generally aligned with flow of ambient air in the downstream section.

4. The method of delivering ambient cooling fluid to an ambient cooled turbine airfoil of claim 1, wherein controlling receipt of the compressed air via at least one compressor shutoff valve in the compressor bleed conduit comprises opening the at least one compressor shutoff valve during startup of the gas turbine engine, and wherein controlling receipt of the ambient air via at least one ambient supply shutoff valve comprises closing the at least one ambient supply shutoff valve during startup of the gas turbine engine.

5. The method of delivering ambient cooling fluid to an ambient cooled turbine airfoil of claim 1, wherein controlling receipt of the compressed air via at least one compressor shutoff valve in the compressor bleed conduit comprises closing the at least one compressor shutoff valve during steady state operation after startup of the gas turbine engine, and wherein controlling receipt of the ambient air via at least one ambient supply shutoff valve comprises opening the at least one ambient supply shutoff valve during steady state operation after startup of the gas turbine engine.

* * * * *